US012629934B2

(12) United States Patent
Kida et al.

(10) Patent No.: US 12,629,934 B2
(45) Date of Patent: May 19, 2026

(54) RECORDING METHOD AND RECORDING DEVICE

(71) Applicant: SEIKO EPSON CORPORATION, Tokyo (JP)

(72) Inventors: Hiroaki Kida, Shiojiri (JP); Shintaro Asai, Matsumoto (JP); Kei Hiruma, Chino (JP); Tomoyuki Ushiyama, Chino (JP); Mitsunobu Nakatani, Shiojiri (JP); Kenta Tsukada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 427 days.

(21) Appl. No.: 18/191,960

(22) Filed: Mar. 29, 2023

(65) Prior Publication Data

US 2023/0312958 A1 Oct. 5, 2023

(30) Foreign Application Priority Data

Mar. 30, 2022 (JP) ................................. 2022-055732

(51) Int. Cl.
*B41J 2/01* (2006.01)
*B41J 2/14* (2006.01)
(Continued)

(52) U.S. Cl.
CPC ............. *B41J 2/01* (2013.01); *B41J 2/14201* (2013.01); *B41J 11/0021* (2021.01);
(Continued)

(58) Field of Classification Search
CPC ...... B41J 2/01; B41J 2/14201; B41J 11/0021; B41M 5/0023; B41M 7/009; C09D 11/322
(Continued)

(56) References Cited

U.S. PATENT DOCUMENTS

2011/0018929 A1 1/2011 Kawashima
2011/0069114 A1 * 3/2011 Ikoshi ................. B41J 2/16552 106/31.13
(Continued)

FOREIGN PATENT DOCUMENTS

JP 2013-227454 A 11/2013
JP 2016-204809 A 12/2016
(Continued)

*Primary Examiner* — Betelhem Shewareged
(74) *Attorney, Agent, or Firm* — Harness, Dickey & Pierce, P.L.C.

(57) ABSTRACT

Provided is a recording method including an adhesion step of jetting an ink composition from an ink jet head and making the ink composition adhere to a recording medium, and a primary heating step of heating the recording medium in the adhesion step, in which the adhesion step includes a step in which a jetting frequency of the ink composition is 15 kHz or greater, the ink composition contains a metal pigment and a solvent component, the solvent component contains an organic solvent, and the metal pigment is a metal particle that has a scaly shape and has a surface treated with a compound represented by Formula (1) or Formula (2).

$$(R^1—)P(O)(OH)_2 \quad (1)$$

$$(R^2—O—)_aP(O)(OH)_{3-a} \quad (2)$$

(In the formulae, $R^1$ and $R^2$ each independently represent a hydrocarbon group having 14 or more carbon atoms which may be substituted with a substituent, and a represents 1 or 2.)

13 Claims, 3 Drawing Sheets

(51) Int. Cl.
*B41J 11/00* (2006.01)
*B41M 5/00* (2006.01)
*B41M 7/00* (2006.01)
*C09D 11/322* (2014.01)

(52) U.S. Cl.
CPC .......... *B41M 5/0023* (2013.01); *B41M 7/009* (2013.01); *C09D 11/322* (2013.01)

(58) Field of Classification Search
USPC .......................................................... 428/208
See application file for complete search history.

(56) References Cited

U.S. PATENT DOCUMENTS

| | | | | |
|---|---|---|---|---|
| 2013/0196127 | A1* | 8/2013 | Toyoda | C09D 11/38 106/31.13 |
| 2016/0311233 | A1 | 10/2016 | Murai et al. | |
| 2019/0300732 | A1* | 10/2019 | Kida | B41M 5/5218 |
| 2019/0345356 | A1* | 11/2019 | Kido | C09D 11/322 |
| 2020/0399479 | A1* | 12/2020 | Zawacky | C09D 7/61 |
| 2021/0284856 | A1 | 9/2021 | Takiguchi et al. | |
| 2022/0032618 | A1 | 2/2022 | Ushiyama et al. | |
| 2023/0312958 | A1* | 10/2023 | Kida | B41M 5/0011 347/102 |

FOREIGN PATENT DOCUMENTS

| | | | |
|---|---|---|---|
| JP | 2019-172862 | A | 10/2019 |
| JP | 2020-138420 | A | 9/2020 |

* cited by examiner

RECORDING METHOD AND RECORDING DEVICE

The present application is based on, and claims priority from JP Application Serial Number 2022-055732, filed Mar. 30, 2022, the disclosure of which is hereby incorporated by reference herein in its entirety.

BACKGROUND

1. Technical Field

The present disclosure relates to a recording method and a recording device.

2. Related Art

In the related art, a composition such as an ink or a coating material containing a metal pigment such as aluminum has been developed to produce a product having metallic glossiness. For example, JP-A-2019-172862 discloses a metallic ink formed of an aluminum pigment. The aluminum pigment disclosed in JP-A-2019-172862 has a surface treated with a fluorine-based treatment agent.

However, an ink composition adheres to a recording medium while the recording medium is heated in some cases for the purpose of accelerating drying of a recorded material and improving the image quality. Further, the jetting frequency of an ink is increased to perform high-definition recording at a high speed so that an image is recorded with smaller ink droplets, and thus a high-resolution image can be efficiently obtained in some cases. When the jetting frequency of ink droplets is increased by performing such a primary heating step, the jetting stability is degraded in some cases.

Therefore, there has been a demand for a recording method that enables an ink composition to have satisfactory jetting stability and enables a recorded material with excellent metallic gloss to be obtained.

SUMMARY

According to an aspect of the present disclosure, there is provided a recording method including an adhesion step of jetting an ink composition from an ink jet head and making the ink composition adhere to a recording medium, and a primary heating step of heating the recording medium in the adhesion step, in which the adhesion step includes a step in which a jetting frequency of the ink composition is 15 kHz or greater, the ink composition contains a metal pigment and a solvent component, the solvent component contains an organic solvent, and the metal pigment is a metal particle that has a scaly shape and has a surface treated with a compound represented by Formula (1) or Formula (2).

$$(R^1\text{—})P(O)(OH)_2 \quad (1)$$

$$(R^2\text{—}O\text{—})_aP(O)(OH)_{3-a} \quad (2)$$

(In the formulae, $R^1$ and $R^2$ each independently represent a hydrocarbon group having 14 or more carbon atoms which may be substituted with a substituent, and a represents 1 or 2.)

According to another aspect of the present disclosure, there is provided a recording device which performs the recording method described above, the device including an ink jet head that jets the ink composition, and a primary heating mechanism that performs the primary heating step.

DESCRIPTION OF EXEMPLARY EMBODIMENTS

Figure 1:
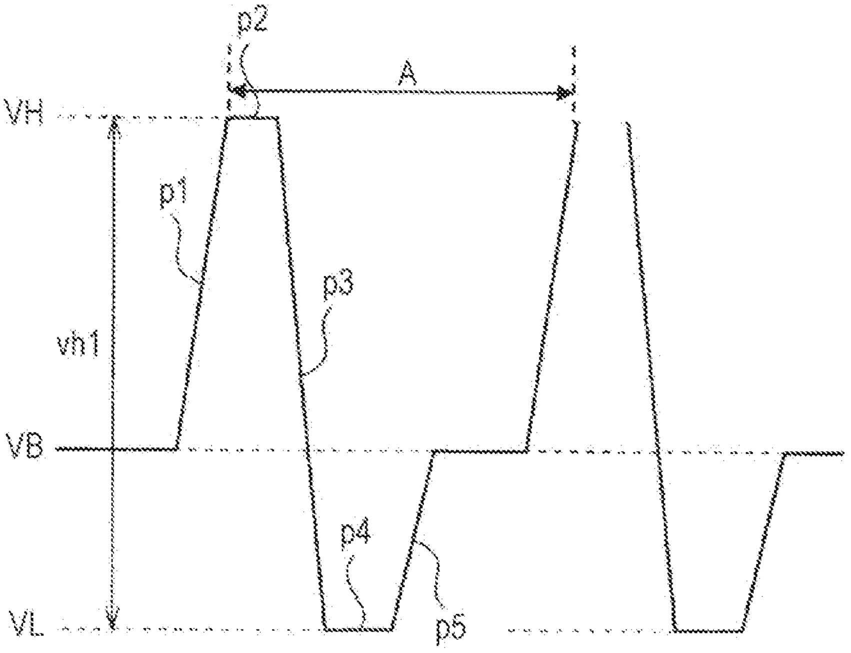
FIG. 1 is a schematic view showing an example of a driving pulse included in a driving signal of an ink jet head.

Hereinafter, embodiments of the present disclosure will be described. The embodiments below will describe examples of the present disclosure. The present disclosure is not limited to the embodiments below and includes various modifications made in a range not departing from the scope of the present disclosure. Further, not all the configurations described below are necessarily essential configurations of the present disclosure.

In the present specification, "(meth)acryl" denotes acryl or methacryl, and "(meth)acrylate" denotes acrylate or methacrylate. Further, "ink composition" will also be referred to as "composition" or "ink".

1. Recording Method

A recording method according to the present embodiment includes an adhesion step of jetting an ink composition from an ink jet head and making the ink composition adhere to a recording medium, and a primary heating step of heating the recording medium in the adhesion step.

1.1. Adhesion Step

In the adhesion step, the ink composition is jetted from an ink jet head and made to adhere to a recording medium. Further, the adhesion step includes a step in which a jetting frequency of the ink composition is 15 kHz or greater. Hereinafter, the ink composition will be described, and then the adhesion step will be described.

1.1. (i) Ink Composition

The ink composition contains a metal pigment and a solvent component.

1.1. (i-1) Metal Pigment

The metal pigment is a metal particle having a surface treated with a surface treatment agent. More specifically, the metal pigment may be formed such that the surface treatment agent adheres to the surface of the metal particle via a chemical bond or through physical adsorption.

1.1. (i-2) Metal Particle

The metal particle is a particle in which at least a part of a site that is visually recognized is formed of a metal material and, for example, the entirety or the vicinity of the outer surface is formed of a metal material. The metal particle has a function of applying metallic gloss in a recorded material to be produced by using an ink composition.

The metal particle is not limited as long as a region including the vicinity of the surface is formed of a metal material, and for example, the entire metal particle may be formed of a metal material or the metal particle may include a base portion formed of a non-metal material, and a coating film that covers the base portion and is formed of a metal material. Further, a passivation film such as an oxide coating film may be formed on the surface of the metal particle.

Problems of water resistance, metallic glossiness, and the like have occurred in the related art even with such a metal particle, but effects of excellent water resistance, excellent metallic glossiness, and the like can be obtained by applying the ink composition of the present embodiment.

As the metal material constituting the metal particle, a single metal, various alloys, or the like can be used. Examples thereof include aluminum, silver, gold, platinum, nickel, chromium, tin, zinc, indium, titanium, iron, copper, and alloys having at least one or more of these metals. Among these metals, the metal particle is formed of preferably aluminum or an aluminum alloy and more preferably aluminum. One of the reasons why aluminum and an aluminum alloy are preferable is that the specific gravity of aluminum and an aluminum alloy is lower than the specific gravity of other metals such as iron. In this manner, since sedimentation of the metal pigment dispersed in the ink extremely slowly proceeds, the ink composition can be stored for a longer period of time while occurrence of density unevenness or the like is effectively suppressed. Further, the glossiness and the high-quality appearance of the recorded material can be improved while an increase in production cost of the recorded material produced by using the ink composition is suppressed when a metal pigment formed of the metal particle of aluminum or an aluminum alloy is used.

Aluminum and aluminum alloys originally exhibit excellent glossiness in various metal materials, but the following problems may occur when particles formed of such materials are applied to the composition. That is, the storage stability (water resistance) of the composition is likely to be decreased, and problems such as a decrease in jetting stability due to an increase in viscosity caused by gelation are likely to occur when the composition is used as an ink composition. On the contrary, even in a case where the metal pigment is formed of metal particles consisting of aluminum or an aluminum alloy, such problems can be made less likely to occur when the surface of the particle is subjected to a surface treatment with a specific surface treatment agent described below according to the present embodiment. That is, the effects of the composition of the present embodiment are more remarkably exhibited when the metal particles consist of aluminum or an aluminum alloy.

The metal particles have a scaly shape. In this manner, the main surfaces of the metal particles are easily arranged on an object, to which the composition is applied, such that the main surfaces are along the surface shape of the object. As a result, the glossiness and the like that the metal material constituting the metal particles has can be more effectively exhibited even in a recorded material to be obtained, and the glossiness and the high-quality appearance of the recorded material can be improved. Further, the rub resistance of the recorded material can also be improved when the metal particles have a scaly shape.

Further, when the metal particles have a scaly shape, the surfaces of the metal particles partially overlap each other and thus coarse particles are formed in a case where the dispersion stability of the metal particles is degraded and the metal particles are aggregated. Therefore, from the viewpoint of having excellent dispersion stability and preventing aggregation of the metal particles, the effects of the composition according to the present embodiment are more remarkably exhibited.

In the present specification, the scaly shape is, for example, a shape in which the area in plan view when the metal particles are observed at a predetermined angle is greater than the area when the metal particles are observed at an angle orthogonal to the observation direction, such as a flat plate shape or a curved plate shape. Particularly, a ratio $S_1/S_0$ of an area $S_1$ [μm$^2$] when the metal particles are observed in a direction in which the projected area is maximized, that is, in plan view to an area $S_0$ [μm$^2$] when the metal particles are observed in a direction in which the area when observed is maximized in the direction orthogonal to the observation direction is preferably 2 or greater, more preferably 5 or greater, still more preferably 8 or greater, even still more preferably 10 or greater, even still more preferably 20 or greater, and even still more preferably 30 or greater. The upper limit of the ratio $S_1/S_0$ is not particularly limited, but is preferably 1000 or less, more preferably 500 or less, still more preferably 100 or less, and even still more preferably 80 or less.

As this value, for example, an average value of values obtained by observing any 50 particles and performing calculation on these particles can be employed. The observation can be performed by using an electron microscope, an atomic force microscope, or the like. Further, as another method, the volume average particle diameter (D50) and the average thickness described below are used, the units thereof are combined, and the volume average particle diameter (D50)/average thickness may be set to be in the above-described ranges.

The average thickness of the metal particles having a scaly shape is preferably 5 nm or greater and 90 nm or less. The lower limit of the average thickness of the metal particles is not particularly limited, but is more preferably 10 nm or greater and still more preferably 15 nm or greater. Further, when the metal particles have a scaly shape, the upper limit of the average thickness of the metal particles is not particularly limited, but is more preferably 70 nm or less, still more preferably 50 nm or less, particularly preferably 30 nm or less, more particularly preferably 20 nm or less, and still more particularly preferably 15 nm or less.

When the metal particles have a scaly shape and the average thickness thereof is 5 nm or greater and 90 nm or less and preferably in the above-described ranges, the effects obtained in a case where the particles as described above have a scaly shape are likely to be more remarkably exhibited.

In addition, the average thickness of the metal particles can be measured by using an atomic force microscope (AFM). For example, the average thickness is defined as an average value obtained by measuring any 50 metal particles using atomic force microscopy. That is, the average thickness is an arithmetic average thickness.

As the preferable ranges and the measuring method of the volume average particle diameter (D50) of the metal particles, the volume average particle diameter D50 of the metal particles is measured using a laser diffraction scattering type particle size distribution measuring device.

The metal particles may be produced by any method, but when the metal particles are formed of aluminum, it is preferable that the metal particles be obtained by forming a film formed of aluminum using a vapor phase film deposition method and crushing the film. Further, variations in characteristics between particles can be suppressed. In addition, even relatively thin metal particles can be suitably produced by the above-described method.

When the metal particles are produced by such a method, for example, the metal particles can be suitably produced by forming a film formed of aluminum on a base material. For example, a plastic film such as polyethylene terephthalate can be used as the base material. Further, the base material may have a release agent layer on a film deposition surface.

Further, it is preferable that the film be crushed by applying ultrasonic vibration to the film in a liquid. In this manner, the metal particles having the above-described particle diameter can be easily obtained, and occurrence of variations in the size, shape, and characteristics between metal particles can be suppressed.

Further, when the film is crushed by the above-described method, alcohols, a hydrocarbon-based compound, an ether-based compound, or a polar compound such as propylene carbonate, γ-butyrolactone, N-methyl-2-pyrrolidone, N,N-dimethylformamide, N,N-dimethylacetamide, dimethylsulfoxide, cyclohexanone, or acetonitrile can be suitably used as the liquid. When such a liquid is used, the productivity of the metal particles is particularly improved while unintentional oxidation or the like of the metal particles is suppressed, and variations in the size, shape, and characteristics between particles can be sufficiently reduced.

1.1. (i-3) Surface Treatment Agent

The metal pigment is a metal particle having a surface treated with a compound represented by Formula (1) or Formula (2) as a surface treatment agent. The surface treatment agent that treats the surface of the metal particle is a compound represented by General Formula (1) or General Formula (2).

$$(R^1—)P(O)(OH)_2 \quad (1)$$

$$(R^2—O—)_aP(O)(OH)_{3-a} \quad (2)$$

(In the formulae, $R^1$ and $R^2$ each independently represent a hydrocarbon group having 14 or more carbon atoms which may be substituted with a substituent, and a represents 1 or 2.)

The compound (phosphonic acid of substituted or unsubstituted alkyl) represented by General Formula (1) is a compound in which the hydrogen atom of phosphonic acid has been substituted with a ($R^1$—) group. Since such compounds have less steric hindrance due to an alkyl moiety, the compounds are likely to be uniformly arranged on the surfaces of the metal particles, and the dispersion stability or gloss of the metal pigment can be enhanced.

Further, the metal particles having a surface treated with the compound represented by Formula (1) or Formula (2) have excellent dispersion stability, and thus it is possible to suppress the aggregation of the metal particles and to prevent the metal particles from being coarse particles. Therefore, the flow of the ink in an ink jet head is not suppressed, and the ink can be rapidly supplied and the jetting stability is excellent even when the jetting frequency is high.

Particularly when the recording method includes a primary heating step described below, since the ink jet head receives heat generated by the primary heating step, the dispersion stability of the metal particles is impaired, and thus the metal particles are aggregated so that coarse particles are formed. However, since the metal particles having a surface treated with the compound represented by Formula (1) or Formula (2) have excellent dispersion stability, the aggregation of the metal particles can be suppressed and the jetting stability is excellent.

The compound represented by General Formula (2) is a compound in which one or two of three hydroxyl groups of phosphoric acid are esterified with a substituted or unsubstituted alkyl group.

The metal particle having a surface treated with the compound represented by Formula (1) or Formula (2) as a surface treatment agent may be a metal particle in which the compound represented by Formula (1) or Formula (2) is bonded to the surface of the metal particle by a chemical reaction.

The compound represented by General Formula (2) is a diester body (di-body) of substituted or unsubstituted alkyl when a represents 1, and the compound represented by Formula (2) is a monoester body (mono-body) of substituted or unsubstituted alkyl when a represents 2. When the compound represented by General Formula (2) is a di-body when a represents 1, the effect of making water difficult to approach the surface of the metal particle is increased by the steric hindrance due to the presence of two substituted or unsubstituted alkyl moieties, and thus the water resistance of the metal pigment can be further improved. Hereinafter, "monoester body" will also be referred to as "mono-body", and "diester body" will also be referred to as "di-body".

In the formulae, $R^1$ and $R^2$ represent a monovalent hydrocarbon group having a carbon skeleton with 14 or more carbon atoms. The hydrocarbon group may have a saturated bond or an unsaturated bond.

$R^1$ and $R^2$ may each independently be substituted with a substituent, and examples of the substituent include any one or more substituents from among a carboxyl group, a hydroxyl group, an amino group, and an oxyalkylene-containing group. When $R^1$ and $R^2$ have a substituent, it is more preferable that $R^1$ or $R^2$, to which the substituent is bonded, be bonded to the carbon atom at a position farthest from P or O from the viewpoint that the dispersion stability of the metal pigment is likely to be improved. Further, among the substituents, the oxyalkylene-containing group is a group having an oxyalkylene structure, and the oxyalkylene structure is also referred to as an alkylene oxide structure. Further, the numbers of carbon atoms of $R^1$ and $R^2$ do not include the number of carbon atoms of the substituents in $R^1$ and $R^2$. In addition, the number of substituents is more preferably 1 when $R^1$ and $R^2$ have a substituent.

The oxyalkylene-containing group has one or more alkylene oxide units and may have two or more alkylene oxide units. Particularly, the oxyalkylene-containing group has a plurality of alkylene oxide units, and these alkylene oxide units may have a repeating structure. The repetition number of the alkylene oxide units is preferably 10 or less and more preferably 4 or less. The lower limit thereof is 1 or greater, preferably 2 or greater, and more preferably 3 or greater. The number of carbon atoms of alkylene in the alkylene oxide unit is preferably 1 or greater and 4 or less.

Examples of the hydrocarbon group having a carbon skeleton with 14 or more carbon atoms include a saturated hydrocarbon group having no double bond nor triple bond between carbon atoms and an unsaturated hydrocarbon group having a double bond or a triple bond between carbon atoms. The hydrocarbon group may be an aromatic hydrocarbon group in which the carbon skeleton has an aromatic ring structure or a chain-like or cyclic aliphatic hydrocarbon group. Particularly, the chain-like aliphatic hydrocarbon group is preferable from the viewpoint that the dispersion stability or the like is more excellent. The chain-like aliphatic hydrocarbon group having a skeleton may be branched chain-like or linear and is preferably linear from the viewpoint that the dispersion stability, the jetting stability, the gloss, and the like are more excellent.

In the compound represented by General Formula (1) and the compound represented by General Formula (2), $R^1$ and $R^2$ in the formulae each independently represent preferably a hydrocarbon group having 14 or more and 32 or less carbon atoms, more preferably a hydrocarbon group having 15 or more and 30 or less carbon atoms, still more preferably a hydrocarbon group having 16 or more and 22 or less carbon atoms, and even still more preferably a hydrocarbon group having 16 or more and 20 or less carbon atoms. In this manner, the dispersion stability and the water resistance of the ink composition are further enhanced, and components can be more easily redispersed even when sedimentation of the components occurs. Further, $R^1$ and $R^2$ may represent an unsubstituted hydrocarbon group, which is preferable.

Further, $R^1$ and $R^2$ in General Formula (1) and General Formula (2) represent preferably hydrocarbon groups having the same number of carbon atoms and more preferably hydrocarbon groups having the same structure. In this manner, the tendency that the surface treatment agent uniformly adheres onto the surface of the metal particle becomes stronger, and the water resistance and the glossiness of the recorded material can be further enhanced in a well-balanced manner.

Specific examples of the compound represented by General Formula (1) include tetradecylphosphonic acid (myristylphosphonic acid), hexadecylphosphonic acid (cetylphosphonic acid), and octadecylphosphonic acid (stearylphosphonic acid). Among these, one or more selected from these are preferable, one or more selected from hexadecylphosphonic acid (cetylphosphonic acid) and octadecylphosphonic acid (stearylphosphonic acid) are more preferable, and octadecylphosphonic acid (stearylphosphonic acid) is still more preferable.

Specific examples of the mono-body of the compound represented by General Formula (2) include phosphoric acid monostearyl ester.

Specific examples of the di-body of the compound represented by General Formula (2) include phosphoric acid distearyl ester.

Since the compound in which a represents 2, among the compounds represented by Formula (2), that is, a phosphoric acid diester body (di-body) contains two alkyl groups and a larger amount of alkyl groups can be introduced to the surface of the metal particle, the hydrophobicity of the surface of the pigment is increased, and the water resistance and the like of the pigment can be further improved.

It is more preferable that the surface treatment agent contain any compound in which a represents 2 between the compound represented by Formula (1) and the compound represented by Formula (2). In this manner, the tendency that the surface treatment agent uniformly adheres onto the surface of the metal particle becomes stronger, and the water resistance and the glossiness can be further enhanced in a well-balanced manner.

Further, the content of the surface treatment agent is 0.5% by mass or greater and 60% by mass or less, preferably 1% by mass or greater and 50% by mass or less, more preferably 5% by mass or greater and 40% by mass or less, still more preferably 5% by mass or greater and 30% by mass or less, and even still more preferably 10% by mass or greater and 20% by mass or less with respect to 100% by mass of the total mass of the metal particles. When the content ratio is set to be in the above-described ranges, the water resistance of the ink composition is further enhanced, and components can be more easily redispersed even when sedimentation of the components occurs.

The mass of the surface treatment agent is the mass of the surface treatment agent contained in the ink composition. When the surface treatment agent contained in the ink composition is a surface treatment agent adhered to the metal particle, the mass of the surface treatment agent is also the mass of the surface treatment agent adhered to the metal particle.

Further, the ink composition according to the present embodiment may contain a surface treatment agent other than the surface treatment agent described above as long as the effects of the present disclosure are not impaired. Examples of such a surface treatment agent include a fluorine-based compound. A compound containing fluorine and one or more selected from phosphorus, sulfur, and nitrogen as constituent elements can be preferably used as the fluorine-based compound, and specific examples thereof include fluorinated phosphonic acid, fluorinated carboxylic acid, fluorinated sulfonic acid, and salts thereof.

The surface treatment on the metal particles with the surface treatment agent may be performed, for example, by allowing a liquid to contain the surface treatment agent when a metal film formed by a vapor phase film deposition method is crushed in the liquid to form the metal particles.

1.1. (i-4) Volume Average Particle Diameter

The volume average particle diameter D50 of the metal pigment obtained by treating the metal particles with the surface treatment agent is preferably 1 μm or less, more preferably 0.5 μm or less, still more preferably 200 nm or greater and 500 nm or less, and particularly preferably 300 nm or greater and 500 nm or less.

In a case where the particle diameter of the metal pigment is in the above-described ranges, clogging of nozzles when the ink is jetted can be reduced. Further, in the case where the particle diameter of the metal pigment is in the above-described ranges, the water resistance is enhanced and the dispersibility can be sufficiently easily obtained even when the specific surface area of the metal pigment is large.

The volume average particle diameter D50 of the metal pigment can be measured in the same manner as in the section of the metal particles.

The content of the metal pigment in the ink composition is preferably 0.3% by mass or greater and 30% by mass or less, more preferably 0.5% by mass or greater and 20% by mass or less, still more preferably 0.8% by mass or greater and 15% by mass or less, even still more preferably 1.0% by mass or greater and 10% by mass or less, even still more preferably 1.0% by mass or greater and 5% by mass or less, and even still more preferably 1.0% by mass or greater and 3% by mass or less with respect to the total amount of the ink composition.

1.1. (ii) Solvent Component

The ink composition contains a solvent component. Examples of the solvent component include an organic solvent and water. The content of the solvent component in the ink composition is preferably 40% by mass or greater, more preferably in a range of 50% to 99.5% by mass, still more preferably in a range of 60% to 99% by mass, and particularly preferably in a range of 70% to 98% by mass.

1.1. (ii-1A) Organic Solvent

Examples of the organic solvent include esters, alkylene glycol ethers, cyclic esters, nitrogen-containing solvents, alcohols, and polyhydric alcohols. Examples of the nitrogen-containing solvents include cyclic amides and acyclic amides. Examples of the acyclic amides include alkoxyalkylamides.

Examples of the esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxy butyl acetate, and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

As the alkylene glycol ethers, monoether or diether of alkylene glycol may be used, and alkyl ether is preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Further, from the viewpoint that the resin in the ink composition is likely to be dissolved or swollen and the friction fastness can be further improved, diether of the alkylene glycol is preferable to monoether of the alkylene glycol.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decalactone, and compounds in which hydrogen atoms of a methylene group adjacent to a carbonyl group thereof are substituted with an alkyl group having 1 to 4 carbon atoms.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the cyclic amides include lactams, and specific examples thereof include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone. These examples are preferable from the viewpoint of promoting film formation of a resin, and 2-pyrrolidone is more particularly preferable.

Examples of the alcohols include compounds in which one hydrogen atom of an alkane is substituted with a hydroxyl group. The number of carbon atoms of the alkane is preferably 10 or less, more preferably 6 or less, and still more preferably 3 or less. Further, the number of carbon atoms of the alkane is 1 or more and preferably 2 or more. The alkane may be linear or branched. Examples of the alcohols include methanol, ethanol, n-propyl alcohol, isopropyl alcohol, n-butanol, 2-butanol, tert-butanol, iso-butanol, n-pentanol, 2-pentanol, 3-pentanol, tert-pentanol, phenoxyethanol, benzyl alcohol, and phenoxy propanol.

When the ink composition contains alcohols, it is more preferable that the ink composition contain alcohol selected from aromatic monohydric alcohol and aliphatic monohydric alcohol having 4 or more carbon atoms. In this manner, the dispersion stability of the metal pigment can be improved. The aromatic monohydric alcohol and the aliphatic monohydric alcohol having 4 or more carbon atoms have slightly strong hydrophobicity, have a satisfactory affinity for the surface treatment agent of the metal pigment, and can increase the water dispersibility of the particles. That is, these alcohols can have a function of coupling the hydrophobicity of the surface of the metal pigment and the hydrophobicity and the hydrophilicity of the water molecules serving as a solvent.

As the aliphatic monohydric alcohol having 4 or more carbon atoms, aliphatic monohydric alcohol having 4 to 10 carbon atoms is preferable, and aliphatic monohydric alcohol having 4 to 8 carbon atoms is more preferable. The aromatic monohydric alcohol is monohydric alcohol having an aromatic ring, and examples of the aromatic ring include a benzene ring and a naphthalene ring. In the aromatic monohydric alcohol, the number of carbon atoms of the alkylene skeleton moiety to which a hydroxyl group is bonded is preferably 1 or more and 4 or less and more preferably 1 or more and 3 or less.

The content (total content) of the aromatic monohydric alcohol and/or the aliphatic monohydric alcohol having 4 or more carbon atoms is preferably 0.5% by mass or greater, more preferably 1% by mass or greater, and particularly preferably 3% by mass or greater with respect to the total mass of the ink composition. Further, the content of the aromatic monohydric alcohol and/or the aliphatic monohydric alcohol having 4 or more carbon atoms is preferably 40% by mass or less, more preferably 30% by mass or less, still more preferably 20% by mass, and particularly preferably 10% by mass or less. Further, it is preferable that the content of the aromatic monohydric alcohol and/or the aliphatic monohydric alcohol having 4 or more carbon atoms be in the above-described ranges with respect to the total mass of the liquid medium component contained in the ink composition.

The polyhydric alcohols contain two or more hydroxyl groups in a molecule. The polyhydric alcohols can be divided into, for example, alkanediols and polyols.

Examples of the alkanediols include compounds in which an alkane is substituted with two hydroxyl groups. Examples of the alkanediols include ethylene glycol (also referred to as ethane-1,2-diol), propylene glycol (also referred to as propane-1,2-diol), 1,2-butanediol, 1,2-pentanediol, 1,2-hexanediol, 1,2-octanediol, 1,3-propanediol, 1,3-butylene glycol (also referred to as 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, and 2-methyl-2-propyl-1,3-propanediol.

Examples of the polyols include a condensate in which two or more molecules of alkanediols are intermolecularly condensed between hydroxyl groups, and a compound containing three or more hydroxyl groups.

Examples of the condensate in which two or more molecules of alkanediols are intermolecularly condensed between hydroxyl groups include dialkylene glycol such as diethylene glycol or dipropylene glycol, and trialkylene glycol such as triethylene glycol or tripropylene glycol.

The compound containing three or more hydroxyl groups is a compound containing three or more hydroxyl groups with an alkane or a polyether structure as a skeleton. Examples of the compound containing three or more hydroxyl groups include glycerin, trimethylolethane, trimethylolpropane, 1,2,5-hexanetriol, 1,2,6-hexanetriol, pentaerythritol, and polyoxypropylene triol.

The organic solvent may be used alone or in combination of two or more kinds thereof.

Among the above-described organic solvents, the ink composition contains preferably one or more selected from alkylene glycol ethers and cyclic ethers and more particularly preferably one or more selected from diethylene glycol diethyl ether, tetraethylene glycol monobutyl ether, and γ-butyrolactone.

The content of the organic solvent is preferably 0.5% by mass or greater, more preferably 5% by mass or greater, still more preferably 10% by mass or greater, particularly preferably 15% by mass or greater, even still more preferably 20% by mass or greater, and even still more preferably 30% by mass or greater with respect to the total mass of the ink composition. The upper limit of the content of the organic solvent is preferably 99.5% by mass or less, more preferably 70% by mass or less, and still more preferably 60% by mass or less. Further, it is preferable that the content of the organic solvent be in the above-described ranges with respect to the total mass of the liquid medium component contained in the ink composition.

The ink composition may be a solvent-based ink, which is preferable. The solvent-based ink is an ink in which solvent components (solvents) of the ink include organic solvents as main components. The content of water in the solvent-based ink is preferably 2% by mass or less, more preferably 1% by mass or less, still more preferably 0.5% by mass or less, and even still more preferably 0.1% by mass or less. The lower limit thereof is 0% by mass or greater.

When the ink composition is the solvent-based ink, the content of the organic solvent is preferably 50% by mass or greater, more preferably in a range of 60% to 99.5% by mass, still more preferably in a range of 70% to 99% by mass, and even still more preferably in a range of 80% to 98% by mass with respect to the amount of the ink.

1.1. (ii-1B) Water

The ink composition may be an aqueous ink. The aqueous ink is an ink in which solvent components (solvents) of the ink include water as a main component. The content of water in the aqueous ink is preferably 40% by mass or greater, more preferably 50% by mass or greater and 99.5% by mass or less, still more preferably 60% by mass or greater and 99% by mass or less, and even still more preferably 70% by mass or greater and 90% by mass or less.

The aqueous ink contains an organic solvent as a solvent component. The content of the organic solvent is preferably 40% by mass or less, more preferably 35% by mass or less, still more preferably 0.5% by mass or greater and 30% by mass or less, even still more preferably 1% by mass or greater and 20% by mass or less, and even still more preferably 3% by mass or greater and 10% by mass or less with respect to the amount of the ink.

1.1. (ii-2) Other Components

The ink composition may contain other components. Examples of the other components include a dispersant, a resin, and other components.

Dispersant

The ink composition may contain a dispersant. Examples of the dispersant include a resin dispersant and a polyoxyalkylene amine compound, and the dispersant is selected from those capable of enhancing the dispersion stability of the metal pigment in the ink composition.

Examples of the resin dispersant include water-soluble resins, for example, (meth)acrylic resins and salts thereof, such as poly(meth)acrylic acid, a (meth)acrylic acid-acrylonitrile copolymer, a (meth)acrylic acid-(meth)acrylic acid ester copolymer, a vinyl acetate-(meth)acrylic acid ester copolymer, a vinyl acetate-(meth)acrylic acid copolymer, and a vinyl naphthalene-(meth)acrylic acid copolymer; styrene-based resins and salts thereof, such as a styrene-(meth)acrylic acid copolymer, a styrene-(meth)acrylic acid-(meth)acrylic acid ester copolymer, a styrene-α-methylstyrene-(meth)acrylic acid copolymer, a styrene-α-methylstyrene-(meth)acrylic acid-(meth)acrylic acid ester copolymer, a styrene-maleic acid copolymer, and a styrene-maleic anhydride copolymer; urethane-based resins and salts thereof, which are polymer compounds (resins) obtained by reacting an isocyanate group with a hydroxyl group and having a urethane bond, may be linear and/or branched, and may or may not have a crosslinked structure; polyvinyl alcohols; vinyl naphthalene-maleic acid copolymers and salts thereof; vinyl acetate-malic acid ester copolymers and salts thereof; and vinyl acetate-crotonic acid copolymers and salts thereof.

When the ink composition contains a dispersant, the lower limit of the content of the dispersant is not particularly limited, but is preferably 0.01% by mass or greater, more preferably 0.06% by mass or greater, and still more preferably 0.10% by mass or greater. Further, the upper limit of the content of the dispersant is not particularly limited, but is preferably 4.0% by mass or less, more preferably 2.0% by mass or less, and still more preferably 1.0% by mass or less.

Resin

The ink composition according to the present embodiment may contain a resin. The resin can function as a binder. Examples of the resin include an acrylic resin, a rosin-modified resin, a terpene-based resin, a polyester resin, a polyamide resin, an epoxy resin, a vinyl chloride resin, a vinyl chloride-vinyl acetate copolymer, a cellulose-based resin (such as cellulose acetate butyrate or hydroxypropyl cellulose), polyvinyl butyral, polyacryl polyol, polyvinyl alcohol, and a urethane resin. Among these, the ink composition contains preferably one or more selected from an acrylic resin, a polyester resin, a urethane resin, and a cellulose-based resin and more preferably an acrylic resin. Further, the acrylic resin is a resin obtained by polymerizing at least an acrylic monomer or may be a copolymer resin of an acrylic monomer and other monomers. Examples of other monomers include a vinyl monomer.

The lower limit of the content of the resin is preferably 0.01% by mass or greater, more preferably 0.06% by mass or greater, still more preferably 0.10% by mass or greater, and particularly preferably 0.15% by mass or greater with respect to the total mass of the ink composition. The upper limit of the content of the resin is preferably 3.0% by mass or less, more preferably 1.0% by mass or less, still more preferably 0.5% by mass or less, and particularly preferably 0.3% by mass or less with respect to the total mass of the ink composition.

Other Components

The ink composition according to the present embodiment may further contain the following components. Examples of such components include water, a leveling agent, a polymerization accelerator, a polymerization inhibitor, a photopolymerization initiator, a dispersant, a surfactant, a penetration accelerator, a moisturizing agent, a coloring agent, a fixing agent, a fungicide, a preservative, an antioxidant, a chelating agent, a thickener, and a sensitizer.

Preferred examples of water include pure water such as ion exchange water, ultrafiltration water, reverse osmosis water, or distilled water and ultrapure water. Particularly, water obtained by being subjected to a sterilization treatment of applying ultraviolet rays to any water described above, adding hydrogen peroxide to any water described above, and the like is preferable from the viewpoint of suppressing growth of mold and bacteria for a long time.

Preferred examples of the surfactant include a silicone-based surfactant and an acetylene glycol-based surfactant.

Further, it is preferable that the ink composition according to the present embodiment be a solvent-based ink or an aqueous ink. In this case, an excellent image quality needs to be obtained by quickly drying the ink adhering to the recording medium by performing the primary heating step, and the present disclosure is particularly useful to obtain excellent jetting stability when the primary heating step is performed. It is particularly preferable that the ink composition be a solvent-based ink. Further, it is preferable that the ink composition be not an ultraviolet curable ink.

1.1. (iii) Jetting Frequency

The adhesion step of the recording method according to the present embodiment includes a step in which the jetting frequency of the ink composition is 15 kHz or greater. Further, the adhesion step may also include a step in which the jetting frequency is less than 15 kHz. A printer formed of a piezoelectric element will be described as an example for a driving signal used for an ink jet head.

FIG. 1 shows a driving pulse included in a driving signal. Further, in FIG. 1, the vertical axis represents the potential of the driving pulse, and the horizontal axis represents the time. In addition, a potential difference (driving voltage) between a lowest potential VL and a highest potential VH of the driving pulse is set as vh1. The driving pulse includes an expansion element p1 that expands the pressure chamber by changing the potential to the positive side from a reference potential VB to an expansion potential VH, an expansion maintenance element p2 that maintains the expansion potential VH for a certain time, a contraction element p3 that drastically contracts the pressure chamber by changing the potential to the negative side from the expansion potential VH to the contraction potential VL, a contraction maintenance (vibration control hold) element p4 that maintains the contraction potential VL for a certain time, and a restoration element p5 that restores the potential from the contraction potential VL to the reference potential VB.

When the driving pulse is supplied to the element that performs jetting, the element is operated in the following manner. First, when the expansion element p1 is supplied to the piezoelectric element, the piezoelectric element contracts and accordingly, the pressure chamber shows a change (here, expansion) from a reference volume corresponding to the reference potential VB to a maximum volume corresponding to the highest potential VH. In this manner, a meniscus of the ink composition exposed to the nozzle is drawn into the pressure chamber side. The expanded state of the pressure chamber is maintained constant over a period for which the expansion maintenance element p2 is supplied.

When the contraction element p3 serving as an element that changes the voltage in a direction opposite to a direction in which the voltage is changed by the expansion element p1 after the expansion maintenance element p2 is supplied to the piezoelectric element, the piezoelectric element is stretched, and thus the pressure chamber shows a drastic change (here, contraction) from the maximum volume to a minimum volume corresponding to the lowest potential VL. The ink composition in the pressure chamber is pressurized by the drastic contraction of the pressure chamber, and accordingly, several picoliters to several tens of picoliters of the ink composition is jetted from the nozzle. The contracted state of the pressure chamber is maintained for a short time over the period for which the contraction maintenance element p4 is supplied. Thereafter, the restoration element p5 is supplied to the piezoelectric element, and the pressure chamber is restored from the volume corresponding to the lowest potential VL to the reference volume corresponding to the reference potential VB. Further, the amount of the ink composition to be jetted (liquid droplet amount) from the nozzle can be increased by further increasing the inclination between the expansion element p1 and the contraction element p3 (absolute value of the voltage change amount per unit time). The following series of driving signals of p1 to p5 are supplied again to the piezoelectric element after a predetermined time from which the restoration element p5 has been supplied. In this manner, ink droplets are continuously driven at an interval of a constant time so that the ink is jetted.

When such a driving pulse is selectively output to the piezoelectric element of the ink jet head from among the driving signal, the liquid is jetted to the target for adhesion (recording medium) from the corresponding nozzle in response to the output. Further, the liquid jetting operation of the ink jet head can be controlled by controlling the driving signal.

The details of the driving signal vary depending on the type of the ink jet head, but common control elements include the jetting frequency in a case of jetting liquid droplets and the driving voltage for performing jetting (amplitude (potential difference) in the waveform in a case of jetting liquid droplets).

The jetting frequency is related to the time interval when the head is continuously driven and related to the time interval for which a series of driving signals of p1 to p5 are continuously supplied to the piezoelectric element. In FIG. 1, when the time interval (period) between one series of driving signals of p1 to p5 and the subsequent series of driving signals of p1 to p5 is defined as A, the jetting frequency is the reciprocal of A. Therefore, the time interval A is short when the jetting frequency is high. The jetting frequency is in units of kHz.

The jetting frequency is related to, for example, a time from jetting of a liquid droplet to jetting of the next liquid droplet and is a reciprocal of the time from jetting of a liquid droplet to jetting of the next liquid droplet. Therefore, for example, the time from jetting of a liquid droplet to jetting of the next liquid droplet is short when the jetting frequency is high.

In regard to the portion of the potential difference of the waveform, a potential difference between the reference potential VB and the contraction potential VL corresponds to the potential difference (driving voltage) when the expansion element p1 for maintaining the expanded state of the pressure chamber is not present. Further, the flying speed of liquid droplets to be jetted can also be controlled by controlling the driving voltage or the voltage waveform. The same applies to a piezo jet and a thermal jet, and the driving system of the ink jet head according to the present embodiment is not limited.

The recording method according to the present embodiment includes a step in which the jetting frequency is 15 kHz or greater. For example, when a high-definition image is recorded, the ink droplets may be set to be small by decreasing the potential difference between the highest potential VH and the lowest potential VL. In this case, the image density can be increased by decreasing the scanning speed of the ink jet head to compensate for the amount of the ink per unit area of the image, but the scanning speed of the ink jet head can be prevented from decreasing by increasing the jetting frequency. Therefore, the recording speed of the entire image can be improved by increasing the jetting frequency.

However, in this case, when the jetting frequency is increased, the fluidity of the ink in the ink jet head may be insufficient due to an increase in the mass of the ink jetted from the ink jet head per unit time. According to the recording method of the present embodiment, since an ink composition with satisfactory dispersion stability of the metal pigment is used, degradation of the fluidity of the ink is suppressed even when the jetting frequency is high, and thus stable jetting of the ink can be realized. Particularly, when a recording device having a long and narrow ink flow path described below is used, the above-described effects can be more remarkably exhibited.

In the example of FIG. 1, the weight of the ink to be jetted by one series of driving signals of p1 to p5 is preferably 0.5 ng or greater and more preferably 1 ng or greater, and preferably 20 ng or less, more preferably in a range of 3 to 15 ng, still more preferably in a range of 5 to 13 ng, and even still more preferably in a range of 8 to 12 ng. In this case, the glossiness and the jetting stability are more excellent, which is preferable.

1.2 Primary Heating Step

The recording method according to the present embodiment includes a primary heating step of heating the ink composition adhered to the recording medium at an early stage. The primary heating step is a step of heating the ink adhered to the recording medium at an early stage and drying the ink. The primary heating step is a heating step for drying at least a part of a liquid medium of the ink adhered to the recording medium at least to an extent that the flow of the ink is reduced. The primary heating step may be performed such that the ink adheres to a heated recording medium or the ink is heated at an early stage after the adhesion. It is preferable that the ink droplets having landed on the recording medium start heating at the latest 0.5 seconds after the landing of the ink droplets.

It is preferable that the primary heating step be performed by irradiating the recording medium with an IR heater or a microwave or blowing hot air to the recording medium using a platen heater or a fan.

The heating in the primary heating step may be performed at least at any timing of before the ink adhesion step, simultaneously with the adhesion, or early after the adhesion, and it is preferable that the heating be performed simultaneously with the adhesion. In this heating order, the ink adhesion step can be performed. It is particularly preferable that the recording medium be heated and the ink composition adhere to the heated recording medium in the ink adhesion step.

When the recording method includes the primary heating step, since the ink composition on the recording medium can be rapidly dried, occurrence of bleeding of the ink can be prevented, which is preferable. For example, when the recording method does not include the primary heating step, since the ink droplets adhered to the recording medium are not dried for some time, the ink droplets gather together and bleeding occurs, and thus the image quality is degraded. In this manner, the glossiness is degraded. On the contrary, when the recording method includes the primary heating step, the ink droplets are suppressed from gathering together by drying the ink droplets rapidly, and thus an excellent image quality is obtained and the glossiness is excellent.

However, in a case where the heating temperature is high when the primary heating step is performed, leafing cannot be sufficiently carried out because the fluidity of the ink is lost before the leafing of the metal pigment on the recording medium, and thus the gloss may be degraded. The metal pigment treated with the treating agent according to the present embodiment is capable of suppressing degradation of the gloss due to insufficient leafing when the primary heating step is performed.

The surface temperature of the recording surface of the recording medium in the primary heating step of heating the ink composition is preferably 30° C. or higher and 60° C. or lower, more preferably 35° C. or higher and 55° C. or lower, and more preferably 30° C. or higher and 50° C. or lower. It is preferable that the surface temperature of the recording medium be in the above-described ranges from the viewpoint of preventing bleeding and further improving the jetting stability.

Further, the surface temperature of the recording medium in the primary heating step is the surface temperature of the recording medium when the ink adheres to the recording medium or the temperature of the recording medium during heating when the recording medium is heated after the adhesion. Further, the surface temperature of the recording medium is a maximum temperature during recording.

1.3 Post-Heating Step

The recording method according to the present embodiment may include a post-heating step (secondary heating step) of heating the recording medium after the ink adhesion step. The post-heating step is a heating step of completing recording and sufficiently heating the recording medium to the extent that the recorded material can be used. The post-heating step is a heating step for sufficiently drying a solvent component of the ink. It is preferable that the post-heating step be started longer than 0.5 seconds after the adhesion of the ink to the recording medium. For example, it is preferable that a recording region where the recording medium is present start heating longer than 0.5 seconds after completion of the adhesion of the ink to the recording region.

The recording medium in the post-heating step can be performed by using, for example, an appropriate heating unit. The surface temperature of the recording medium in this case is preferably 40° C. or higher, more preferably 45° C. or higher, and still more preferably 50° C. or higher. The upper limit thereof is not limited, but is preferably 120° C. or lower, more preferably 75° C. or lower, still more preferably 70° C. or lower, and even still more preferably 60° C. or lower. Further, the heating temperature is preferably lower than or equal to the softening point of the base material of the recording medium.

2. Recording Device

As a recording device that performs the recording method according to the present embodiment, a recording device that includes an ink jet head jetting the ink composition and a primary heating mechanism performing the primary heating step and performs recording using the above-described recording method may be exemplified.

2.1. Outline of Device Configuration

Figure 2:
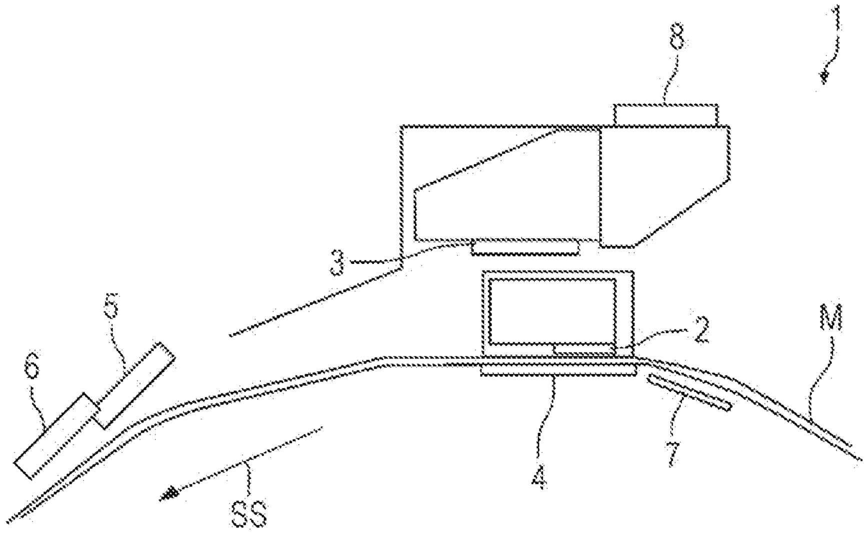
FIG. 2 is a schematic cross-sectional view schematically showing a recording device.

FIG. 2 is a schematic cross-sectional view schematically showing a recording device. As shown in FIG. 2, a recording device 1 includes an ink jet head 2, an IR heater 3, a platen 4, a heating heater 5, a cooling fan 6, a preheater 7, and a ventilation fan 8. Further, the ink jet head is mounted on a carriage (not shown) and performs main scanning in a front-rear direction of the figure so that the ink adheres to a recording medium M. Further, the platen 4 is provided with a platen heater (not shown). The recording device 1 includes a control unit (not shown) and performs recording by controlling each unit. Further, the ink is supplied to the ink jet head 2 from an ink housing body (not shown).

2.2. Configuration Related to Ink Jet Head

The ink jet head 2, which is a recording head, is configured to perform recording on the recording medium M by jetting the ink composition from a nozzle of the ink jet head 2 to make the ink composition adhere to the recording medium M. The ink jet head 2 shown in FIG. 2 is a serial type ink jet head and performs scanning on the recording medium M a plurality of times relatively in a main scanning direction so that the ink adheres to the recording medium M. The ink jet head 2 is mounted on the carriage (not shown). The ink jet head 2 performs scanning on the recording medium M a plurality of times relatively in a main scanning direction by an operation of a carriage moving mechanism that allows the carriage to move in a medium width direction (front-rear direction of the figure) of the recording medium M. The medium width direction is a main scanning direction of the ink jet head 2. The scanning carried out in the main scanning direction is also referred to as main scanning.

Here, the main scanning direction is a direction in which the carriage on which the ink jet head 2 is mounted moves. In FIG. 2, the main scanning direction is a direction intersecting a sub-scanning direction which is a transport direction of the recording medium M indicated by an arrow SS. Further, an image is recorded on the recording medium M by repeatedly performing main scanning of the ink jet head 2 and sub-scanning which is the transport of the recording medium M a plurality of times.

The ink composition can be jetted from the ink jet head 2 using a known method of the related art. For example, a method of jetting liquid droplets using vibration of a piezoelectric element, that is, a jetting method of forming ink droplets by mechanical deformation of an electrostrictive element is used.

2.3. Primary Heating Mechanism

The recording device 1 may include a primary heating mechanism that performs the primary heating step of heating the recording medium M when the ink is jetted from the ink jet head 2 and made to adhere to the recording medium. As the primary heating mechanism, a conduction type heating mechanism, a blast type heating mechanism, a radiation type heating mechanism, or the like can be used. The conduction type heating mechanism conducts heat from a member in contact with the recording medium to the recording medium. Examples thereof include a platen heater. Further, the platen heater is not shown in the figure, but is integrated with the platen 4. The blast type heating mechanism dries the ink by sending normal temperature air or hot air to the recording medium. Examples thereof include a blast fan. The radiation type heating mechanism heats the recording medium by radiating radiation that generates heat to the recording medium. Examples thereof include IR radiation. Although not shown, a heater similar to the platen heater may be provided immediately downstream of the platen 4 in the SS direction. These primary heating mechanisms may be used alone or in combination.

For example, the recording device includes the IR heater 3 and the platen heater as the primary heating mechanism.

Further, when the IR heater 3 is used, the recording medium M can be heated in a radiation manner by infrared rays radiated from the ink jet head 2 side. In this manner, the ink jet head 2 is also likely to be heated simultaneously, but the recording medium M can be heated without being affected by the thickness of the recording medium M as compared to when the recording medium M is heated from the rear surface thereof using the platen heater or the like. Further, the primary heating mechanism may include various fans (such as the ventilation fan 8) that apply hot air or air at the same temperature as the temperature of the environment to the recording medium M to dry the ink on the recording medium M.

The platen heater can heat the recording medium M at a position opposing to the ink jet head 2 via the platen 4. The platen heater is capable of heating the recording medium M in a conduction manner and is used as necessary in the ink jet recording method.

Further, the recording device 1 may include the preheater 7 that heats the recording medium M in advance before the ink adheres to the recording medium M.

2.4. Post-Heating Mechanism

The recording device may also include a post-heating mechanism that performs a post-heating step of heating the recording medium after a white ink adhesion step and a non-white ink adhesion step and drying and fixing the ink.

The heating heater 5 used for the post-heating mechanism dries and solidifies the ink adhered to the recording medium M. When the heating heater 5 heats the recording medium M on which an image has been recorded, the moisture and the like contained in the ink can be more rapidly evaporated and scattered so that an ink film is formed of the resin contained in the ink. In this manner, the ink film is firmly fixed or bonded on the recording medium M, and thus the film-forming properties are improved and an excellent high-quality image can be obtained in a short time.

2.5. Other Configurations

2.5.1. Cooling Mechanism and the Like

The recording device 1 may include the cooling fan 6. An ink coating film can be formed on the recording medium M with excellent adhesiveness by drying the ink recorded on the recording medium M and cooling the ink on the recording medium M with the cooling fan 6.

2.5.2 Type

The recording device shown in FIG. 2 is a serial printer that performs so-called serial type recording. The recording device may be a line printer that includes a line head and performs line type recording.

The line head includes a nozzle array in which a plurality of nozzles are aligned in the width direction of the recording medium and has a length greater than or equal to the width of the recording medium M to be transported, and thus an image can be recorded at once on the recording medium M to be transported in the width direction of the recording medium. Further, recording can be performed by scanning once. In addition, recording performed by scanning twice or more times can also be carried out by performing scanning once performed by transporting the recording medium, returning the recording medium in a direction opposite to the transport direction, transporting the recording medium again, and performing scanning again.

Further, the scanning may be performed by the head in which the position with respect to the recording medium to be transported is fixed or the scanning may be performed while the head moves with respect to the recording medium fixed in the platen region.

Further, a recording device capable of performing line type recording can be configured as shown in FIG. 2 except that the ink jet head 2 is changed to a line head. Specifically, the heating mechanisms such as the ventilation fan 8, the IR heater 3, the platen heater, and the preheater 7 above the ink jet head 2 shown in FIG. 2 may be similarly provided above or below the line head. Further, the recording device may include the heating heater 5 serving as a post-heating mechanism shown in FIG. 1 and the cooling fan 6.

2.5.3. Details of Ink Jet Head

Figure 3:
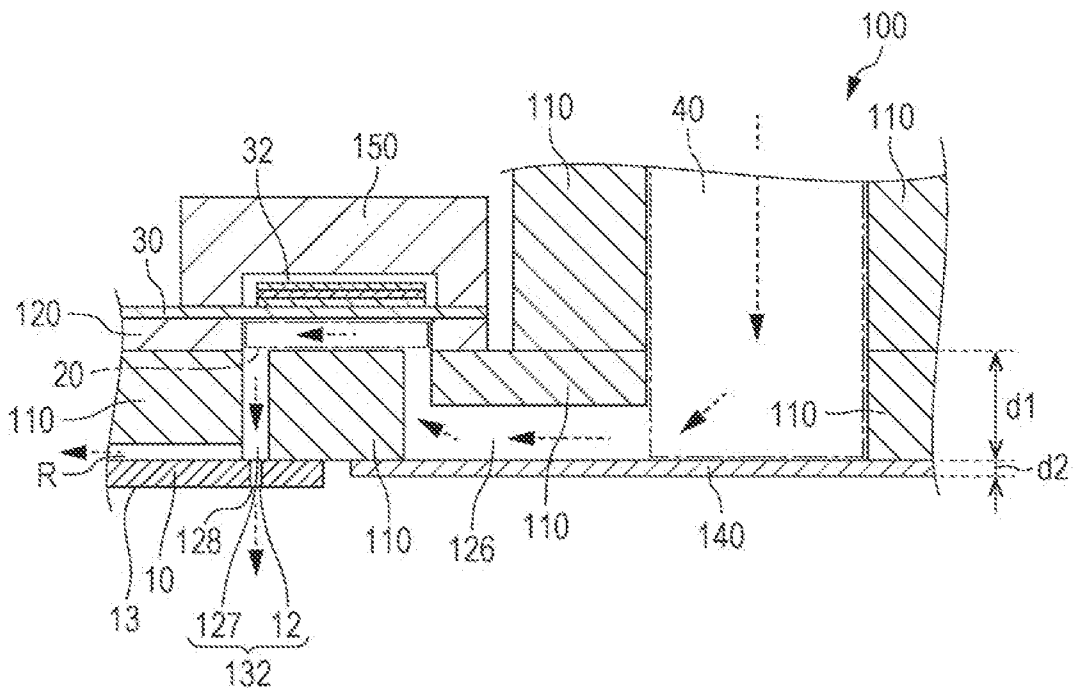
FIG. 3 is a schematic view showing a cross section of a main part as an example of an ink jet head according to an embodiment.

In the ink jet head of the recording device, the distance between the pressure chamber and the nozzle may be 0.5 mm or greater. FIG. 3 is a schematic view showing a cross section of a main part in the ink jet head 100 as an example of the ink jet head of the recording device. FIG. 3 schematically shows the flow of the ink from an ink supply chamber 40 to a nozzle hole 12 during an ink jetting operation by dashed line arrows.

Further, FIG. 3 shows a piezoelectric element 32 in a simplified manner. Further, the ink jet head 100 is configured to include a communication plate 110 and a cover 150.

As shown in FIG. 3, the ink jet head 100 includes a nozzle plate 10 having a plurality of nozzle holes 12, a plurality of pressure chambers 20 each communicating with the plurality of nozzle holes 12 formed in the nozzle plate 10, a vibration plate 30 changing the volume of each of the plurality of pressure chambers 20, and an ink supply chamber 40 supplying the ink to the plurality of the pressure chamber 20. Further, the plurality of configurations are arranged in the depth direction of the figure, and FIG. 3 shows a cross section of one set of these configurations.

The nozzle plate 10 has a plurality of nozzle holes 12 for jetting the ink, the plurality of nozzle holes 12 are aligned in rows, and a nozzle surface 13 is formed on the surface of the nozzle plate 10. The number of nozzle holes 12 provided in the nozzle plate 10 is not particularly limited.

The ink jet head 100 includes a pressure chamber substrate 120 for forming the pressure chamber 20. As shown in FIG. 3, the pressure chamber substrate 120 includes a communication plate 110 serving as a flow path forming substrate between the pressure chamber substrate 120 and the nozzle plate 10. The communication plate 110 defines the space between the nozzle plate 10 and the pressure chamber substrate 120 so that an ink supply chamber 40 (liquid storing unit), a supply port 126 communicating with the ink supply chamber 40, and the pressure chamber 20 communicating with the supply port 126 are formed. That is, the ink supply chamber 40, the supply port 126, and the pressure chamber 20 are defined by the nozzle plate 10, the communication plate 110, the pressure chamber substrate 120, and the vibration plate 30.

The communication plate 110 has a communication hole 127 that communicates with the nozzle hole 12 from the pressure chamber 20. A jetting port 128 of the ink is formed at an end portion of the communication hole 127 formed in the surface where the communication plate 110 is in contact with the nozzle plate 10. The jetting port 128 communicates with the nozzle hole 12 formed in the nozzle plate 10.

The vibration plate 30 is provided in contact with the pressure chamber substrate 120, and the piezoelectric element 32 is formed in contact with the vibration plate 30. The piezoelectric element 32 is electrically coupled to a piezoelectric element driving circuit (not shown) and can be operated (vibration and deformation) based on the signal of the piezoelectric element driving circuit. The vibration plate 30 is deformed by the operation of the piezoelectric element 32 so that the volume of the pressure chamber 20 is changed, and thus the internal pressure of the pressure chamber 20 can be changed. The piezoelectric element 32 is not particularly limited, and examples thereof include an element that is deformed by application of a voltage (electromechanical conversion element).

Further, the ink jet head 100 includes a compliance sheet 140 and a cover 150 accommodating the piezoelectric element 32, as the members forming a part of the ink flow path. The compliance sheet 140 forms a supply port 126 that communicates with the ink supply chamber 40 between the compliance sheet 140 and the communication plate 110. Further, the compliance sheet 140 is an elastic film having flexibility and functions as a damper for jetting and circulating the ink and has a function of suppressing damage to the ink jet head 100 due to deformation when the volume of the ink is expanded.

In the present embodiment, the ink supply chamber 40, the supply port 126, the pressure chamber 20, and the communication hole 127 are described separately, but these are all liquid flow paths, and the design of the flow paths is not limited as long as the pressure chamber 20 is formed.

The pressure chamber 20 formed with the above-described configuration is a space defined by the communication plate 110, the pressure chamber substrate 120, and the vibration plate 30, which is a space that does not include the supply port 126, the communication hole 127, the jetting port 128, and the nozzle hole 12. That is, a space facing a portion that applies a pressure to the ink, such as the vibration plate 30, the pressure chamber substrate 120, or the communication plate 110, and a space which is adjacent to the space and in which the cross-sectional area of the cross section in a direction in which the ink moves is the same as the cross-sectional area of the space are defined as the pressure chamber 20, and the volume of the pressure chamber 20 is the volume of this space. As described above, the pressure chamber 20 is a space having a volume changed by displacement of the vibration plate 30 and is defined as a space having no constricted flow path communicating with the space.

The volume of the pressure chamber is preferably 1000 pl or greater and 4000 pl or less, more preferably 1500 pl or greater and 3700 pl or less, and still more preferably 2000 pl or greater and 3300 pl or less. The volume of the pressure chamber is the volume of one pressure chamber.

The distance from the pressure chamber to the nozzle of the ink jet head is the distance from a position at an end of the pressure chamber where the ink is directed to the nozzle hole from the pressure chamber to the tip of the nozzle hole. The distance from the pressure chamber to the nozzle of the ink jet head is the distance from the pressure chamber 20 to the nozzle hole 12 in the example of FIG. 3 and is the same as a total of a length d1 of the communication plate 110 in the thickness direction and the length of the nozzle plate 10 in the thickness direction in the example of FIG. 3.

The distance from the pressure chamber to the nozzle of the ink jet head is not limited, but is preferably 0.2 mm or greater and 5 mm or less, more preferably 0.5 mm or greater and 3 mm or less, still more preferably 0.7 mm or greater and 2 mm or less, and even still more preferably 0.8 mm or greater and 1.5 mm or less.

It is preferable that the distance from the pressure chamber to the nozzle of the ink jet head be in the above-described ranges from the viewpoint that the degree of freedom of the design for the positions of the pressure chamber and the nozzle in the ink jet head is high. Further, when the distance from the pressure chamber to the nozzle of the ink jet head is out of the above-described ranges, the following problems may occur.

When the ink is circulated into narrow flow paths in the form of small tubes, the surfaces of scales are oriented in parallel with the direction in which the ink moves, and the scaly metal pigment moves. In this manner, the ink easily moves the flow paths, which positively affects the jetting stability of the ink. However, when the dispersion of the metal pigment is unstabilized, a plurality of surface portions of the scaly metal pigment overlap each other and aggregate, and thus coarse particles are likely to be formed. When coarse particles are formed due to the lamination of the surface portions of the scaly metal pigment, since the surfaces are unlikely to be oriented to the direction in which the ink moves, the ink is difficult to move, and thus the metal pigment no longer has the scaly shape in appearance. In such a case, the ink composition is difficult to circulate in the head. Particularly when the jetting frequency is high, such concerns increase. The flow path from the pressure chamber to the nozzle of the ink jet head is in the form of small tubes, which is assumed to be the reason why such an ink composition is difficult to circulate.

However, since the ink composition used for the recording method according to the present embodiment contains a metal pigment treated with a specific phosphorus-based treatment agent, the fluidity is unlikely to be degraded, and the ink can be stably jetted even when the jetting frequency is high.

2.5.4. Circulation Mechanism

The recording device may include a circulation path that circulates the ink composition. The ink composition containing a metal pigment is likely to cause filter clogging of the head due to occurrence of the aggregation of the metal pigment, but the occurrence of aggregation is suppressed by circulating the ink composition. That is, the occurrence of aggregation is suppressed by circulating the ink composition so that the aggregation of the metal particles is loosened and the aggregates of the metal particles are thinned by mixing the ink composition with a new ink supplied from a liquid container. According to the present embodiment, even when the recording device does not include a circulation path, excellent jetting stability can be obtained, which is preferable. Further, the recording device does not necessarily require the circulation path, which is preferable.

The circulation path includes at least one of a circulation return path that returns the ink composition from the ink flow path used to supply the ink composition to the ink jet head or a circulation return path that returns the ink composition from the ink jet head. A recording device including the circulation return path that returns the ink composition from the ink jet head between the circulation return paths is preferable.

R in FIG. 3 is a circulation return path provided in the ink jet head. The circulation return path R makes the ink that has not been jetted from the nozzle, flow out of the ink jet head. In the example of FIG. 3, the circulation return path R is provided in the communication hole 127. The circulation return path R is provided for each pressure chamber. The ink that has flown to the left side in the figure from the circulation return path R is collected, for example, in an ink circulation chamber (not shown) from the circulation return path R provided for each pressure chamber and is made to flow out of the ink jet head from the ink circulation chamber. The circulation return path R may be provided, for example, in the pressure chamber instead of being provided in the communication hole 127.

Figure 4:
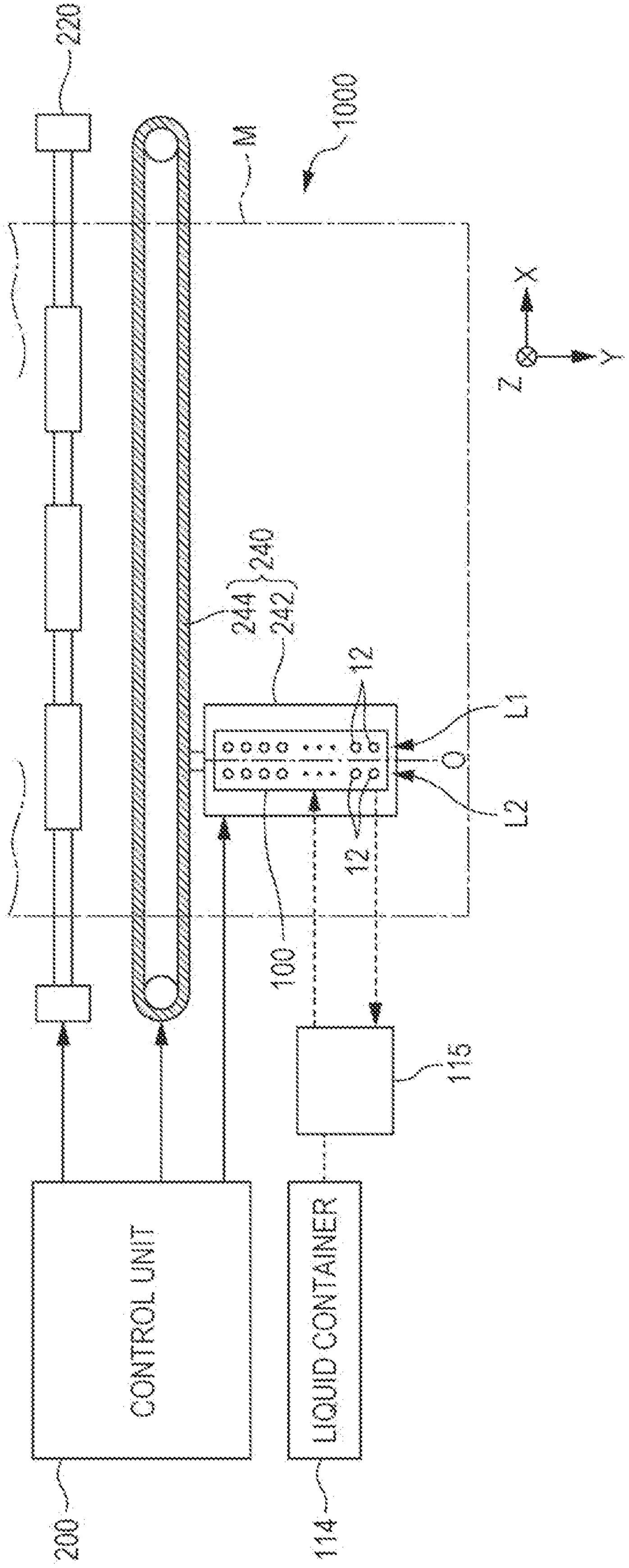
FIG. 4 is a configuration view showing an example of a recording device according to an embodiment.

FIG. 4 is a configuration view showing a recording device 1000 as an example of the recording device. The recording device 1000 is an ink jet type printing device that jets the ink composition to the recording medium M. The recording medium M is typically printing paper, and a resin film or a recording medium formed of any material such as a cloth can be used as the recording medium M. As shown in FIG. 4, a liquid container 114 that stores the ink composition is installed in the recording device 1000. For example, a cartridge attachable to and detachable from the recording device 1000, a bag-like ink pack formed of a flexible film, or an ink tank capable of replenishing the ink composition is used as the liquid container 114. A plurality of kinds of ink compositions with different color tones may be stored in the liquid container 114. The ink may be supplied to the ink jet head after the ink is supplied from the liquid container 114 to a sub-tank 115 and accumulated in the sub-tank. Although not shown, a self-sealing valve is provided in the flow path in which the ink is supplied from the sub-tank 115 to the ink jet head. Further, a filter that captures foreign matter may be provided downstream of the self-sealing valve.

As shown in FIG. 4, the recording device 1000 includes a control unit 200, a transport mechanism 220, a moving mechanism 240, and the ink jet head 100. The control unit 200 includes a processing circuit such as a central processing unit (CPU) or a field programmable gate array (FPGA), and a storage circuit such as a semiconductor memory and integrally controls each element of the recording device 1000. The transport mechanism 220 transports the recording medium M in a Y direction under the control of the control unit 200.

The moving mechanism 240 reciprocates the ink jet head 100 in an X direction under the control of the control unit 200. The X direction is a direction intersecting (typically, orthogonal to) the Y direction in which the recording medium M is transported. The moving mechanism 240 includes a substantially box-shaped transport member 242 (carriage) that accommodates the ink jet head 100 and a transport belt 244 to which the transport member 242 is fixed. Further, a configuration in which a plurality of ink jet heads 100 are mounted on the transport member 242 or a configuration in which the liquid container 114 and the ink jet head 100 are mounted on the transport member 242 can be employed.

The ink jet head 100 jets the ink supplied from the liquid container 114 to the recording medium M from a plurality of nozzles N (jetting holes) under the control of the control unit 200. A desired image is formed on the surface of the recording medium M by each ink jet head 100 jetting the ink to the recording medium M in parallel with the transport of the recording medium M by the transport mechanism 220 and the repeated reciprocation of the transport member 242. Hereinafter, a direction perpendicular to an X-Y plane (for example, a plane parallel to the surface of the recording medium M) will be referred to as a Z direction. The direction in which the ink is jetted by each ink jet head 100 (typically, the vertical direction) corresponds to the Z direction.

As shown in FIG. 4, a plurality of nozzles N of the ink jet head 100 are aligned in the Y direction. The plurality of nozzles N are divided into a first row L1 and a second row L2 arranged in parallel with an interval in the X direction. The first row L1 and the second row L2 are a set of the plurality of nozzles N linearly aligned in the Y direction. Further, the positions of the nozzles N can be made different in the Y direction between the first row L1 and the second row L2 (that is, zigzag arrangement or staggered arrangement), but a configuration in which the positions of the nozzles N are made to match each other in the Y direction between the first row L1 and the second row L2 will be described below as an example for convenience. A plane (Y-Z plane) O that passes through a central axis parallel to the Y direction and is also parallel to the Z direction in the ink jet head 100 will be referred to as "central plane" in the description below.

The ink composition supplied from the sub-tank 115 to the ink jet head 100 is jetted from the nozzle holes N, but a path for returning the ink composition to the sub-tank 115 from the ink jet head 100 is provided. That is, the ink jet head 100 of the recording device 1000 includes the pressure chamber that applies a pressure to the ink composition to jet the ink composition from the nozzles and the circulation path that circulates the ink composition in the section from the pressure chamber to the nozzles. In other words, the recording device 1000 includes the circulation return path that returns the ink from the ink jet head 100.

The circulation return path in FIG. 4 is a circulation return path that returns the ink made to flow out of the ink jet head, to the sub-tank by the circulation return path in FIG. 3.

The ink returned to the sub-tank 115 is supplied to the ink jet head 100 again. In this case, the ink can be circulated in and out of the ink jet head 100, and the occurrence of aggregation of the ink is further suppressed, which is preferable.

Meanwhile, in FIG. 4, the ink having circulated the ink flow path oriented to the direction of the ink jet head 100 from the sub-tank 115 may be branched to the ink flow path (not shown) in front of the ink jet head 100 without being supplied to the ink jet head 100, flow in the ink flow path oriented to the direction of the sub-tank 115 from the ink jet head 100, and be returned to the sub-tank 115. In this case, the flow path oriented to the sub-tank 115 from the branch point is the circulation return path. That is, the flow path is the circulation return path that returns the ink from the ink flow path supplying the ink to the ink jet head 100. In this case, a circulation mechanism may be provided between the branch point and the sub-tank 115. Even in this case, the ink can be circulated outside the ink jet head 100, and the occurrence of aggregation of the ink is remarkably suppressed.

Further, the circulation path when the ink jet recording device includes a circulation path that circulates the ink composition is a circulation path indicating, in a broad sense, the entire part circulating the ink which is provided between the sub-tank 115 and the ink jet head 100 or inside the ink jet head 100 in FIG. 1. Further, the sub-tank 115 may be provided in the form of a tank and may serve as a junction where the ink returned by the circulation return path and the ink discharged from the liquid container can be combined.

2.5.5. Recording Medium

Examples of the recording medium used for the recording method include an ink absorbing recording medium such as paper or fabric. The ink absorbing recording medium is a recording medium having a recording surface that easily absorbs an ink. Examples of the paper include plain paper, paper used exclusively for ink jet, and corrugated cardboard. Examples of the fabric include natural fibers/synthetic fibers such as cotton, polyester, and wool, and non-woven fabric.

Further, other examples of the recording medium include a non-absorbing recording medium consisting of a plastic material, a metal, glass, ceramics, wood, or the like. The non-absorbing recording medium is a recording medium having a recording surface that is unlikely to absorb an ink. Examples of the recording medium consisting of a plastic material include a plastic film and a plastic sheet. The plastic is not limited, and examples thereof include vinyl chloride, polyester, and polyolefin. Examples of the polyester include polyethylene terephthalate.

Further, other examples of the recording medium also include a low-absorbing recording medium. The low-absorbing recording medium is a recording medium having a recording surface having the second lowest absorbency after the non-absorbing recording medium. Examples of the low-absorbing recording medium include a recording medium having a surface provided with a coating layer (receiving layer) for receiving a liquid, and examples of the recording medium in which the base material is paper include actual printing paper. Examples of the coating layer include a coating layer that is unlikely to absorb an ink and is coated with particles of an inorganic compound together with a binder.

The low-absorbing or non-absorbing recording medium denotes a recording medium having a property of not absorbing a liquid or hardly absorbing a liquid. For example, it is preferable that the non-absorbing or low-absorbing recording medium be "recording medium in which the water absorption amount from the start of contact to 30 $msec^{1/2}$ in the Bristow method is 10 $mL/m^2$ or less".

The Bristow method is a method that has been widely used as a method of measuring the liquid absorption amount in a short time and that is also adopted by Japan Technical Association of The Pulp And Paper Industry (JAPAN TAPPI). The details of the test method are described in Standard No. 51 "Paper and Paperboard, Liquid Absorbency Test Method, Bristow Method" of "Paper and Pulp Test Method (2000) by JAPAN TAPPI".

Meanwhile, an absorbing recording medium denotes a recording medium that does not correspond to the non-absorbing or low-absorbing recording medium.

Further, the shape of the recording medium is not particularly limited and may be any of a sheet shape, a plate shape, an object shape, or the like.

3. Examples and Comparative Examples

Hereinafter, the present disclosure will be described in more detail based on examples, but the present disclosure is not limited to such examples. Hereinafter, "%" is on a mass basis unless otherwise specified.

3.1. Preparation of Ink Composition

First, a polyethylene terephthalate film having a thickness of 20 μm and a smooth surface with a surface roughness Ra of 0.02 μm or less was prepared. Next, a release layer was formed on one entire surface of the film by coating the surface with a release resin solubilized by acetone using a roll coater. The polyethylene terephthalate film on which the release layer had been formed was transported into a vacuum deposition device at a speed of 5 m/s to form a film formed of Al with a thickness of 15 nm under reduced pressure.

Next, the polyethylene terephthalate film on which the Al film had been formed was immersed in tetrahydrofuran, and ultrasonic vibration at 40 kHz was applied thereto, thereby obtaining a dispersion liquid of metal particles made of Al.

The tetrahydrofuran was removed by a centrifuge, and diethylene glycol diethyl ether was added thereto, thereby obtaining a suspension in which the content of the metal particles was 5% by mass. The ratio of the mass of the dispersant to the mass of the metal particles was set to 10% by mass.

Next, the suspension was treated with a circulation type high-output ultrasonic crusher so that the metal particles were crushed into a predetermined size. Ultrasonic waves at 20 kHz were applied in the treatment.

Next, the aggregation of the metal particles was loosened by performing a heat treatment on the suspension at 55° C. for 2 hours while irradiating the suspension with ultrasonic waves at 40 kHz, to disperse the metal particles in a state of primary particles. Thereafter, a treatment agent listed in each table was added to the suspension such that the ratio of the mass of the treatment agent to the mass of the metal particles is as listed in each table.

Further, the treatment agent was allowed to react on the surface of the metal particle by performing a heat treatment on the suspension at 55° C. while irradiating the suspension with ultrasonic waves at 28 kHz, thereby obtaining a dispersion liquid of the metal pigment having a surface modified with the treatment agent. Further, in each example, the dispersion liquid was separately taken out for confirmation, diethylene glycol diethyl ether was removed with a centrifuge to confirm diethylene glycol diethyl ether, and as a result, the presence of the surface treatment agent in each example was not confirmed. As shown in the result, the surface treatment agent was assumed to adhere to the metal pigment.

The organic solvents and the binder listed in the table were added to the obtained dispersion liquid of the metal pigment, thereby obtaining ink compositions of inks 1 to 14. The ink compositions were solvent-based compositions.

The results of measuring the volume average particle diameters of the metal pigments contained in the ink compositions obtained in the above-described manner are listed in Tables 1 and 2. The volume average particle diameters of the metal pigments of the inks 5 and 6 were adjusted by changing the treatment time with a circulation type high-output ultrasonic wave crusher. The thicknesses of the metal pigments of the inks 8 and 9 were adjusted by adjusting the vapor deposition amount during aluminum vapor deposition.

The compositions and the like of the obtained inks 1 to 14 are listed in Tables 1 and 2.

TABLE 1

| | | Ink 1 | Ink 2 | Ink 3 | Ink 4 | Ink 5 | Ink 6 | Ink 7 |
|---|---|---|---|---|---|---|---|---|
| Pigment | Aluminum pigment | 1.5 | 1.5 | 1.5 | 1.5 | 1.5 | 1.5 | 1.5 |
| Phosphorus-based treatment agent | Tetradecylphosphoric acid | — | — | 0.15 | — | — | — | — |
| | Octadecyl phosphonate | — | 0.15 | — | — | — | — | — |
| | Stearylphosphoric acid | 0.15 | — | — | — | 0.15 | 0.15 | 0.10 |
| | Tetracosylphosphoric acid | — | — | — | 0.15 | — | — | — |
| Organic solvent | DEDG | Remaining amount | Remaining amount | Remaining amount | Remaining amount | Remaining amount | Remaining amount | Remaining amount |
| | BTGH | 10.0 | 10.0 | 10.0 | 10.0 | 10.0 | 10.0 | 10.0 |
| | γBL | 2.5 | 2.5 | 2.5 | 2.5 | 2.5 | 2.5 | 2.5 |
| Binder | PARALOID B60 | 0.1 | 0.1 | 0.1 | 0.1 | 0.1 | 0.1 | 0.1 |
| | Total | 100 | 100 | 100 | 100 | 100 | 100 | 100 |
| Physical property of ink | Particle diameter (μm) | 0.4 | 0.4 | 0.4 | 0.4 | 0.3 | 0.5 | 0.4 |
| | Thickness (nm) | 15 | 15 | 15 | 15 | 15 | 15 | 15 |

TABLE 2

| | | Ink 8 | Ink 9 | Ink 10 | Ink 11 | Ink 12 | Ink 13 | Ink 14 |
|---|---|---|---|---|---|---|---|---|
| Pigment | Aluminum pigment | 1.5 | 1.5 | 1.5 | 1.5 | 1.5 | 1.5 | 1.5 |
| Phosphorus-based treatment agent | Octylphosphoric acid | — | — | 0.15 | — | — | — | — |
| | Tridecylphosphoric acid | — | — | — | 0.15 | — | — | — |
| | Stearylphosphoric acid | 0.15 | 0.15 | — | — | — | — | — |
| Si coupling agent | Octadecyltrimethoxysilane | — | — | — | — | — | — | 1.50 |
| Fluorine-based Si coupling agent | FAS13 | — | — | — | — | 0.15 | — | — |
| Fluorine-modified alkyl phosphoric acid | FHP | — | — | — | — | — | 0.15 | — |
| Organic solvent | DEDG | Remaining amount | Remaining amount | Remaining amount | Remaining amount | Remaining amount | Remaining amount | Remaining amount |
| | BTGH | 10.0 | 10.0 | 10.0 | 10.0 | 10.0 | 10.0 | 10.0 |
| | γBL | 2.5 | 2.5 | 2.5 | 2.5 | 2.5 | 2.5 | 2.5 |
| Binder | PARALOID B60 | 0.1 | 0.1 | 0.1 | 0.1 | 0.1 | 0.1 | 0.1 |
| Total | | 100 | 100 | 100 | 100 | 100 | 100 | 100 |

TABLE 2-continued

| | | Ink 8 | Ink 9 | Ink 10 | Ink 11 | Ink 12 | Ink 13 | Ink 14 |
|---|---|---|---|---|---|---|---|---|
| Physical property of ink | Particle diameter (μm) | 0.4 | 0.4 | 0.4 | 0.4 | 0.4 | 0.4 | 0.4 |
| | Thickness (nm) | 5 | 30 | 15 | 15 | 15 | 15 | 15 |

The content of each component contained in each ink composition will be described below.

- Octylphosphoric acid (having 8 carbon atoms) (Tokyo Chemical Industry Co., Ltd.)
- Tridecylphosphoric acid (having 13 carbon atoms) (Tokyo Chemical Industry Co., Ltd.)
- Tetradecylphosphoric acid (having 14 carbon atoms) (Tokyo Chemical Industry Co., Ltd.)
- Octadecyl phosphonate (having 18 carbon atoms) (Tokyo Chemical Industry Co., Ltd.)
- Stearylphosphoric acid (having 18 carbon atoms) (Tokyo Chemical Industry Co., Ltd.)
- Tetracosylphosphoric acid (having 24 carbon atoms) (Tokyo Chemical Industry Co., Ltd.)
- Octadecyltrimethoxysilane (silane coupling agent) (Tokyo Chemical Industry Co., Ltd.)
- FAS13: 1H,1H,2H,2H-perfluorooctyltrimethoxysilane
- FHP: 2-(perfluorohexyl)ethylphosphonic acid (having 8 carbon atoms) (Tokyo Chemical Industry Co., Ltd.)
- DEDG: diethylene glycol diethyl ether
- BTGH: tetraethylene glycol monobutyl ether
- γBL: γ-butyrolactone
- PARALOID B60: binder (acrylic resin, manufactured by The Dow Chemical Company)

The volume average particle diameter (D50) of the metal pigment in the tables was measured by using MICROTRAC MT-3300 (manufactured by MicrotracBEL Corp., laser diffraction scattering type particle size distribution measuring device). Further, the thickness of the metal pigment was measured with an atomic force microscope NanoNaviE-Sweep (manufactured by SII Nano Technology Inc.). Further, the viscosity of each ink composition at 25° C. which was measured in conformity with JIS Z 8809 using a rotational viscometer was a value in a range of 1.5 mPa-s or greater and 15 mPa-s or less.

3.2. Evaluation Method 3.2.1. Recording Test

A modified machine (SC-S80650, manufactured by Seiko Epson Corporation) was filled with the ink of each example and each comparative example listed in Tables 3 to 5. The nozzle diameter was set to 20 μm. The volume of the pressure chamber was set to 2900 pl. The length of the flow path from the pressure chamber to the nozzle in FIG. 3 was set to the value listed in the tables. In the examples with “present” in the columns of “presence or absence of circulation” in the tables, a circulation path for the ink as shown in FIGS. 3 and 4 was provided in the recording device to circulate the ink during the recording.

The driving wave signal of the ink jet head was prepared as shown in FIG. 1, the jetting frequency was set as listed in the tables, and the carriage speed was adjusted such that the dot density for one pass in the main scanning direction was set to 300 dpi. Multi-pass recording was performed, and the recording resolution of the final image was set to 600×600 dpi. The ink weight of the ink droplets was set to the value in the tables.

As the recording medium, vinyl chloride (Mactac 5829R, manufactured by Mactac) was used. The surface temperature of the recording medium during the adhesion of the ink (primary heating step) was set to the value listed in the tables using a platen heater. In the reference examples, the primary heating step was not performed. Further, secondary heating was performed at 50° C. using a secondary heating heater.

3.2.2. Jetting Stability (Long-Term)

For each example, recording was continuously performed for 10 hours. The nozzles after the recording were inspected, the occurrence rate of non-jetting nozzles was acquired, the jetting stability was evaluated according to the following criteria based on the occurrence rate, and the results were listed in the tables.

A: 0%
B: greater than 0% and less than 1.0%
C: 1.0% or greater and less than 3.0%
D: 3.0% or greater and less than 6.0%
E: 6.0% or greater 3.2.3. Jetting Stability after Storage The ink of each example was poured in a container and stored at 60° C. for 5 days, and recording was performed for 1 minute. After the recording, the nozzles were inspected. The occurrence rate of non-jetting nozzles was acquired, the jetting stability was evaluated according to the following criteria based on the occurrence rate, and the results were listed in the tables.

A: 0%
B: greater than 0% and less than 1.0%
C: 1.0% or greater and less than 3.0%
D: 3.0% or greater and less than 6.0%
E: 6.0% or greater 3.2.4. Gloss (Initial Stage)

The recording pattern was recorded with the ink before storage. The gloss of the pattern was measured after 24 hours at room temperature. The glossiness at 60° was measured using a gloss meter GM-268A (manufactured by Konica Minolta Inc.). The glossiness was evaluated according to the following evaluation criteria based on the results.

A: 450 or greater
B: 400 or greater and less than 450
C: 350 or greater and less than 400
D: less than 350

3.2.5. Glossiness after Storage

The recording pattern was recording using the ink after the storage at 60° for 5 days. The gloss of the pattern was measured after 24 hours at room temperature. The glossiness was evaluated according to the following evaluation criteria based on the results.

A: 450 or greater
B: 400 or greater and less than 450
C: 350 or greater and less than 400
D: less than 350

3.2.6. Recording Speed

The time required for recording a solid pattern with a size of 30 cm×30 cm was confirmed for each example. The result was compared with the result of Example 1 at 20 kHz, and the recording speed was evaluated according to the following evaluation criteria.

A: The time required for recording was 100% or less
B: The time required for recording was greater than 100% and 140% or less C: The time required for recording was greater than 140%

3.3. Evaluation Results

The evaluation results are listed in Tables 3 to 5.

TABLE 3

| | | Example 1 | Example 2 | Example 3 | Example 4 | Example 5 | Example 6 | Example 7 | Example 8 |
|---|---|---|---|---|---|---|---|---|---|
| | Ink No. | Ink 1 | Ink 2 | Ink 3 | Ink 4 | Ink 5 | Ink 6 | Ink 7 | Ink 8 |
| Recording conditions | Jetting frequency (kHz) | 20 | 20 | 20 | 20 | 20 | 20 | 20 | 20 |
| | Weight of ink (ng) | 11 | 11 | 11 | 11 | 11 | 11 | 11 | 11 |
| | Primary heating (° C.) | 40 | 40 | 40 | 40 | 40 | 40 | 40 | 40 |
| | Length of flow path (mm) | 1 | 1 | 1 | 1 | 1 | 1 | 1 | 1 |
| | Presence or absence of circulation | Absent | Absent | Absent | Absent | Absent | Absent | Absent | Absent |
| Evaluation | Jetting stability (long-term) | A | A | B | A | A | B | B | A |
| | Jetting stability (60° C., after 5 days) | A | A | A | A | A | B | A | A |
| | Glossiness (initial stage) | B | A | B | A | C | A | C | A |
| | Glossiness (60° C., after 5 days) | B | A | B | A | C | A | C | A |
| | Recording speed | A | A | A | A | A | A | A | A |

TABLE 4

| | | Example 9 | Example 10 | Example 11 | Example 12 | Example 13 | Example 14 | Example 15 | Example 16 |
|---|---|---|---|---|---|---|---|---|---|
| | Ink No. | Ink 9 | Ink 6 | Ink 1 | Ink 1 | Ink 6 | Ink 1 | Ink 6 | Ink 6 |
| Recording conditions | Jetting frequency (kHz) | 20 | 15 | 40 | 20 | 20 | 20 | 20 | 20 |
| | Weight of ink (ng) | 11 | 11 | 11 | 4.5 | 11 | 11 | 11 | 11 |
| | Primary heating (° C.) | 40 | 40 | 40 | 40 | 40 | 45 | 35 | 40 |
| | Length of flow path (mm) | 1 | 1 | 1 | 1 | 1 | 1 | 1 | 0.5 |
| | Presence or absence of circulation | Absent | Absent | Absent | Absent | Present | Absent | Absent | Absent |
| Evaluation | Jetting stability (long-term) | A | A | B | A | A | B | A | A |
| | Jetting stability (60° C., after 5 days) | A | B | A | A | A | A | B | B |
| | Glossiness (initial stage) | C | A | A | C | A | B | A | A |
| | Glossiness (60° C., after 5 days) | C | A | A | C | A | B | A | A |
| | Recording speed | A | B | A | A | A | A | A | A |

TABLE 5

| | | Comparative Example 1 | Comparative Example 2 | Comparative Example 3 | Comparative Example 4 | Comparative Example 5 | Comparative Example 6 | Comparative Example 7 | Reference Example 1 | Reference Example 2 |
|---|---|---|---|---|---|---|---|---|---|---|
| | Ink No. | Ink 10 | Ink 11 | Ink 12 | Ink 13 | Ink 14 | Ink 1 | Ink 13 | Ink 1 | Ink 10 |
| Recording conditions | Jetting frequency (kHz) | 20 | 20 | 20 | 20 | 20 | 10 | 10 | 20 | 20 |
| | Weight of ink (ng) | 11 | 11 | 11 | 11 | 11 | 11 | 11 | 11 | 11 |
| | Primary heating (° C.) | 40 | 40 | 40 | 40 | 40 | 40 | 40 | 40 | 40 |
| | Length of flow path (mm) | 1 | 1 | 1 | 1 | 1 | 1 | 1 | 1 | 1 |
| | Presence or absence of circulation | Absent | Absent | Absent | Absent | Absent | Absent | Absent | Absent | Absent |
| Evaluation | Jetting stability (long-term) | C | C | C | D | C | A | A | A | B |
| | Jetting stability (60° C., after 5 days) | B | B | C | C | C | A | C | A | B |
| | Glossiness (initial stage) | D | D | D | A | D | B | A | C | E |
| | Glossiness (60° C., after 5 days) | E | E | E | A | E | B | A | C | E |
| | Recording speed | A | A | A | A | A | C | C | A | A |

It was found that when the recording method of each example, including an adhesion step of jetting the ink composition containing a scaly metal pigment having a surface treated with a compound represented by Formula (1) or Formula (2) and an organic solvent from the ink jet head and making the ink composition adhere to a recording medium, and a primary heating step of heating the recording medium in the adhesion step, in which the adhesion step includes a step in which the jetting frequency of the ink composition is 15 kHz or greater, was used, the jetting stability was satisfactory, a colored material with excellent gloss of an image was obtained, and the recording speed was also excellent.

On the contrary, in Comparative Examples 1 to 5, the ink did not contain a metal pigment having a surface treated with a compound represented by Formula (1) or Formula (2), and thus the jetting stability during long-term recording was degraded.

In Comparative Examples 6 and 7, the recording method did not include the step in which the jetting frequency is 15 kHz or greater, and thus the recording speed was poor. Further, in Comparative Example 7, the ink did not contain the metal pigment having a surface treated with a compound represented by Formula (1) or Formula (2), but the jetting stability during long-term recording was not degraded. Based on the result, it was found that the jetting stability was problematic when the jetting frequency was high.

In Reference Examples 1 and 2, the recording method did not include the primary heating step, and the glossiness at an initial stage was likely to be degraded as compared to when the recording method included the primary heating step. In Reference Example 2, the ink did not contain the metal pigment having a surface treated with a compound represented by Formula (1) or Formula (2), but the jetting stability during long-term recording was not degraded. Based on this result, it was found that the jetting stability was problematic when the primary heating step was performed.

The embodiments and the modified examples described above are merely examples, and the present disclosure is not limited thereto. For example, each embodiment and each modified example can be appropriately used in combination.

The present disclosure is not limited to the above-described embodiments, and various modifications can be made. For example, the present disclosure has configurations that are substantially the same as the configurations described in the embodiments, for example, configurations with the same functions, the same methods, and the same results as described above or configurations with the same purposes and the same effects as described above. Further, the present disclosure has configurations in which parts that are not essential in the configurations described in the embodiments have been substituted. Further, the present disclosure has configurations exhibiting the same effects as the effects of the configurations described in the embodiments or configurations capable of achieving the same purposes as the purposes of the configurations described in the embodiments. Further, the present disclosure has configurations in which known techniques have been added to the configurations described in the embodiments.

The following contents can be derived from the embodiments and the modified examples described above.

A recording method including: an adhesion step of jetting an ink composition from an ink jet head and making the ink composition adhere to a recording medium; and a primary heating step of heating the recording medium in the adhesion step, in which the adhesion step includes a step in which a jetting frequency of the ink composition is 15 kHz or greater, the ink composition contains a metal pigment and a solvent component, the solvent component contains an organic solvent, and the metal pigment is a metal particle that has a scaly shape and has a surface treated with a compound represented by Formula (1) or Formula (2).

$$(R^1\text{—})P(O)(OH)_2 \quad (1)$$

$$(R^2\text{—O—})_aP(O)(OH)_{3-a} \quad (2)$$

(In the formulae, $R^1$ and $R^2$ each independently represent a hydrocarbon group having 14 or more carbon atoms which may be substituted with a substituent, and a represents 1 or 2.)

According to the recording method, even in a case where an ink composition containing a scaly metal pigment is used when the recording method includes the step in which the jetting frequency is high and the primary heating step, the ink composition can be jetted from the ink jet head with satisfactory stability, and a recorded material with satisfactory gloss can be obtained.

In the recording method described above, the metal pigment may have an average thickness of 30 nm or less.

According to the recording method, even when the metal pigment has a shape that is likely to degrade the jetting stability, the effects are more remarkably exhibited in terms of enhancing the jetting stability. Further, a recording material with more excellent metallic gloss can be obtained.

In the recording method described above, a surface temperature of the recording medium in the primary heating step may be 30° C. or higher and 50° C. or lower.

According to the recording method, even when the recording method includes a step that is likely to degrade the jetting stability, the effects are more remarkably exhibited in terms of enhancing the jetting stability.

In the recording method described above, the metal pigment may have a volume average particle diameter D50 of 0.5 μm or less.

According to the recording method, the jetting stability can be further enhanced.

In the recording method described above, the ink composition may be a solvent-based ink or an aqueous ink.

In the recording method described above, a content of the surface treatment agent may be 1% by mass or greater and 50% by mass or less with respect to 100% by mass of a total mass of the metal particle.

According to the recording method, a recorded material with more satisfactory metallic gloss can be obtained.

In the recording method described above, $R^1$ and $R^2$ may represent an unsubstituted hydrocarbon group.

According to the recording method, a recorded material with more satisfactory water resistance can be obtained.

In the recording method described above, $R^1$ and $R^2$ may represent a hydrocarbon group having 15 or more and 30 or less carbon atoms.

According to the recording method, the dispersion stability of the metal pigment is further enhanced.

In the recording method described above, the metal particle may consist of aluminum or an aluminum alloy.

According to the recording method, a recorded material with more satisfactory metallic gloss can be obtained.

In the recording method described above, the ink composition may be a solvent-based ink, and a content of the organic solvent may be 60% by mass or greater with respect to a total amount of the ink composition.

According to the recording method, the ink composition is dried at a high speed, and thus recording can be carried out at a higher speed.

In the recording method described above, a distance from a pressure chamber to a nozzle of the ink jet head may be 0.5 mm or greater.

According to the recording method, even when the ink jet head has a structure that is likely to degrade the jetting stability, the effects are more remarkably exhibited in terms of enhancing the jetting stability.

In the recording method described above, the ink jet head may include a pressure chamber that applies a pressure to the ink composition to jet the ink composition from a nozzle; and a circulation path that circulates the ink composition in a section from the pressure chamber to the nozzle.

According to the recording method, recording can be carried out with more satisfactory jetting stability.

A recording device which performs the recording method described above, the device including: an ink jet head that jets the ink composition; and a primary heating mechanism that performs the primary heating step.

According to the recording device, even in a case where an ink composition containing a scaly metal pigment is used when the recording method includes the step in which the jetting frequency is high and the primary heating step, the ink composition can be jetted from the ink jet head with satisfactory stability, and a recorded material with satisfactory gloss can be obtained.

What is claimed is:

1. A recording method comprising:

an adhesion step of jetting an ink composition from an ink jet head and making the ink composition adhere to a recording medium;

a primary heating step of heating the recording medium in the adhesion step; and a post-heating step of heating the recording medium after the primary heating step, wherein the adhesion step includes a step in which a jetting frequency of the ink composition is 15 kHz or greater;

the adhesion step is performed to the recording medium supported by a platen, the primary heating step is performed to the recording medium supported by the platen, the post-heating step is performed downstream of the platen in a transport direction of the recording medium, a surface temperature of the recording medium at a position opposing to the ink jet head in the primary heating step is 30 to 45° C., a surface temperature of the recording medium in the post-heating step is 50 to 120° C., the ink composition contains a metal pigment and a solvent component, the solvent component contains an organic solvent, the metal pigment is a metal particle that has a scaly shape and has a surface treated with a compound represented by Formula (2) as a surface treatment agent, $$(R^2—O—)_aP(O)(OH)_{3-a} \quad (2)$$

where $R^2$ represents an unsubstituted hydrocarbon group having 14 or more carbon atoms, and a represents 1 or 2, and the metal pigment has an average thickness of 30 nm or less.

2. The recording method according to claim 1, wherein the metal pigment has an average thickness of 5 to 30 nm.

3. The recording method according to claim 1, wherein a surface temperature of the recording medium in the primary heating step is 35° C. or higher and 45° C. or lower.

4. The recording method according to claim 1, wherein the metal pigment has a volume average particle diameter D50 of 0.5 μm or less.

5. The recording method according to claim 1, wherein the ink composition is a solvent-based ink or an aqueous ink.

6. The recording method according to claim 1, wherein a content of the surface treatment agent is 1% by mass or greater and 50% by mass or less with respect to 100% by mass of a total mass of the metal particle.

7. The recording method according to claim 1, wherein a surface temperature of the recording medium in the post-heating step is 50 to 75° C.

8. The recording method according to claim 1, wherein $R^1$ and $R^2$ represent a hydrocarbon group having 15 or more and 30 or less carbon atoms.

9. The recording method according to claim 1, wherein the metal particle consists of aluminum or an aluminum alloy.

10. The recording method according to claim 1, wherein the ink composition is a solvent-based ink, and a content of the organic solvent is 60% by mass or greater with respect to a total amount of the ink composition.

11. The recording method according to claim 1, wherein a distance from a pressure chamber to a nozzle of the ink jet head is 0.5 mm or greater.

12. The recording method according to claim 1, wherein the ink jet head includes a pressure chamber that applies a pressure to the ink composition to jet the ink composition from a nozzle; and a circulation path that circulates the ink composition in a section from the pressure chamber to the nozzle.

13. A recording device which performs the recording method according to claim 1, the device comprising:

an ink jet head that jets the ink composition; and a primary heating mechanism that performs the primary heating step.

* * * * *